United States Patent [19]

Asaoka et al.

[11] Patent Number: 5,626,925
[45] Date of Patent: May 6, 1997

[54] LIQUID CRYSTAL DEVICE

[75] Inventors: Masanobu Asaoka, Yokohama; Hideaki Takao, Sagamihara; Makoto Kojima, Hino, all of Japan

[73] Assignee: Canon Kabushiki Kaisha, Tokyo, Japan

[21] Appl. No.: 401,658

[22] Filed: Mar. 10, 1995

Related U.S. Application Data

[63] Continuation of Ser. No. 13,327, Feb. 4, 1993, abandoned.

[30] Foreign Application Priority Data

Feb. 5, 1992 [JP] Japan ................ 4-47805

[51] Int. Cl.$^6$ ..................... C09K 15/00
[52] U.S. Cl. ............ 428/1; 478/473.5; 349/130; 349/132
[58] Field of Search .............. 428/1, 473.5; 353/75, 353/77, 78; 350/340, 341, 320

[56] References Cited

U.S. PATENT DOCUMENTS

| | | | |
|---|---|---|---|
| 4,367,924 | 1/1983 | Clark et al. | 359/56 |
| 4,655,561 | 4/1987 | Kanbe et al. | 359/56 |
| 5,046,822 | 9/1991 | Matsuda et al. | 359/75 |
| 5,116,530 | 5/1992 | Togano et al. | 252/299.61 |
| 5,129,727 | 7/1992 | Hanyu et al. | 359/75 |
| 5,132,596 | 3/1993 | Hanyu et al. | 428/1 |
| 5,250,330 | 10/1993 | Asaoka | 428/1 |
| 5,268,780 | 12/1993 | Manyu | 359/75 |
| 5,320,883 | 6/1994 | Asaoka | 428/1 |
| 5,326,600 | 7/1994 | Asaoka | 428/1 |
| 5,330,803 | 7/1994 | Takao | 428/1 |
| 5,464,668 | 11/1995 | Asaoka | 428/1 |

FOREIGN PATENT DOCUMENTS 107216  8/1981  Japan .

*Primary Examiner*—Leszek Kiliman
*Attorney, Agent, or Firm*—Fitzpatrick, Cella, Harper & Scinto

[57] ABSTRACT

A liquid crystal device is constituted by disposing a liquid crystal between a pair of substrates; at least one of which has thereon an alignment film comprising a polyimide formed by reaction between an acid component and at least two diamine components of formula (1) below:

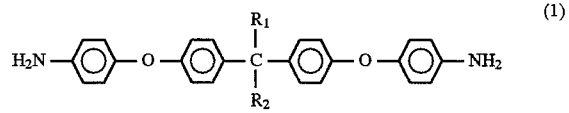

wherein $R_1$ and $R_2$ independently denote an alkyl group or fluoroalkyl group having 1–10 carbon atom.

7 Claims, 6 Drawing Sheets

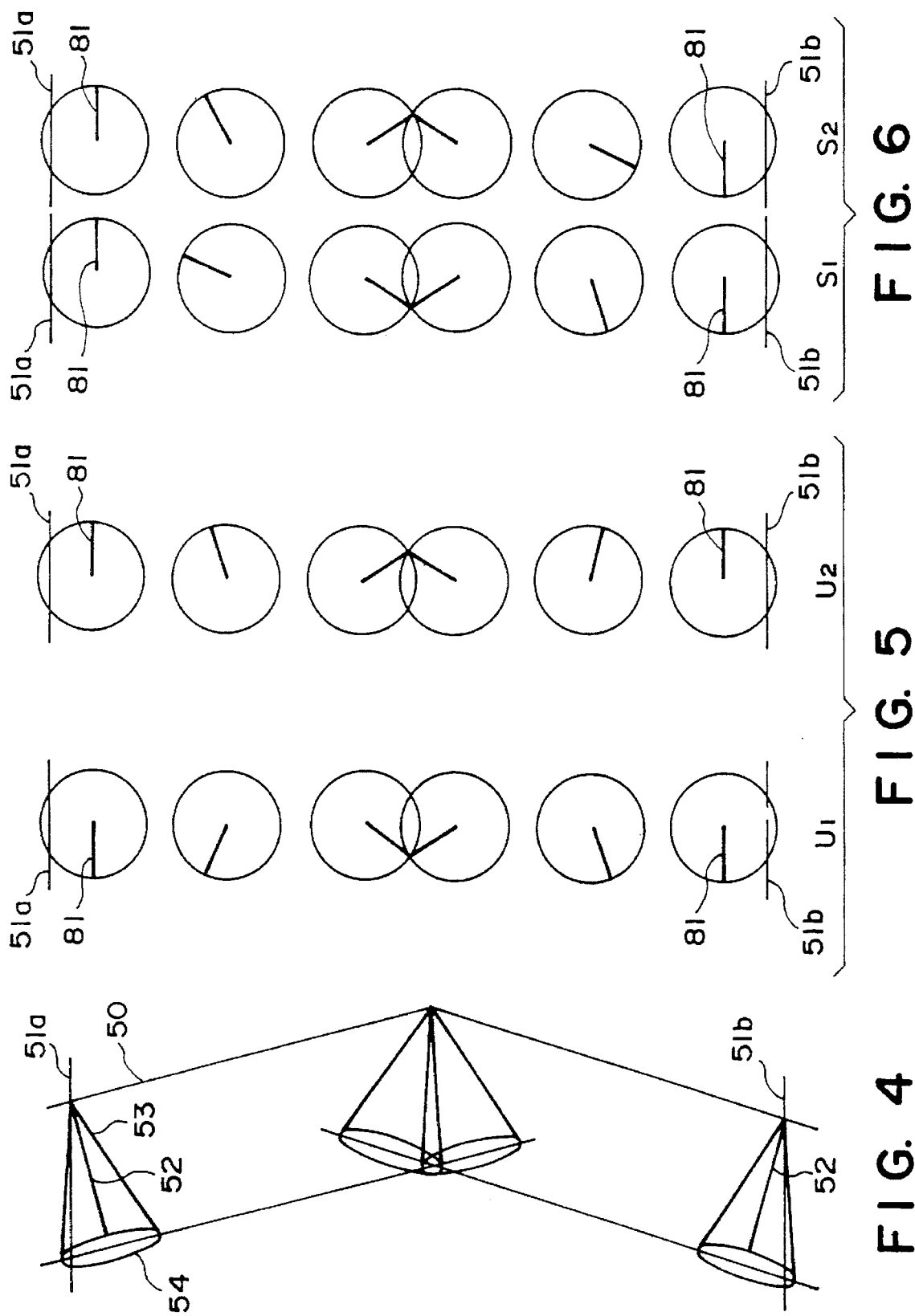

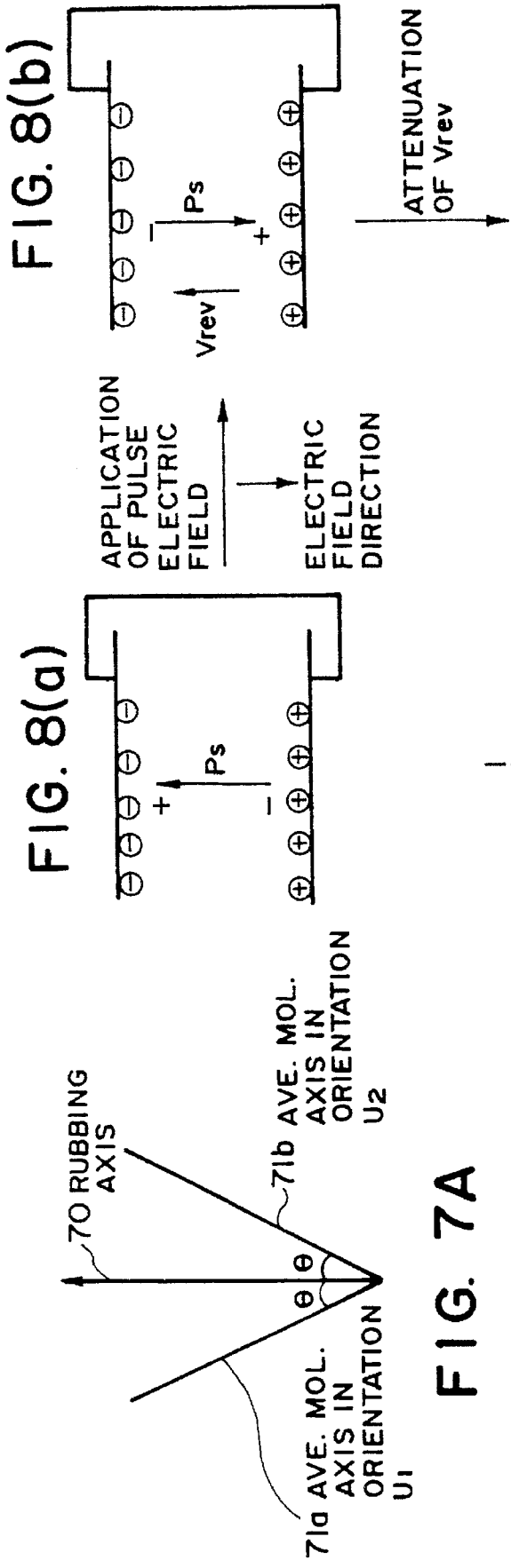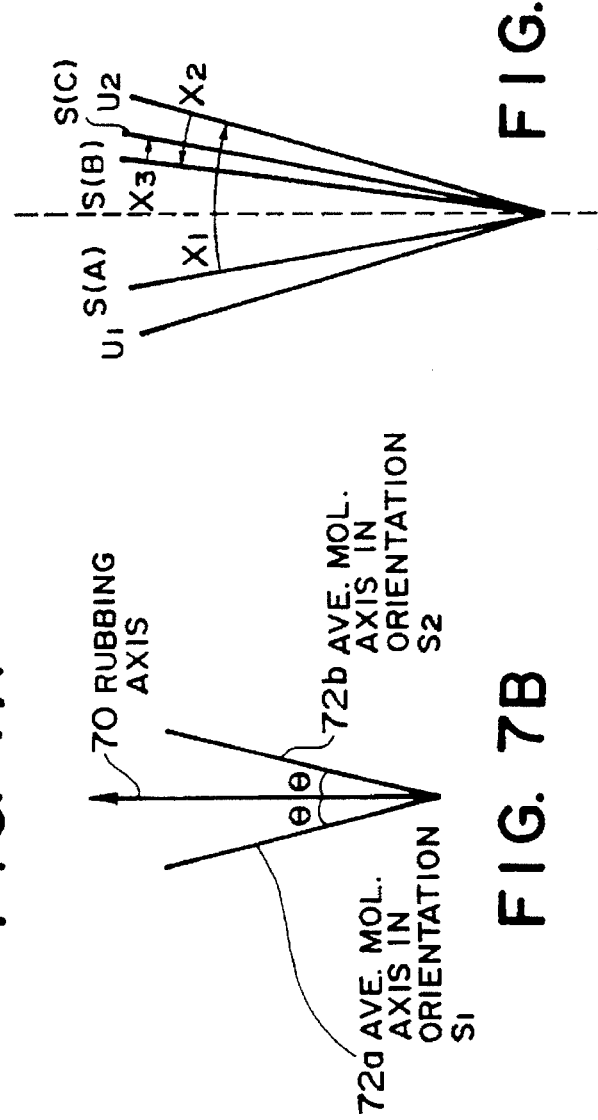

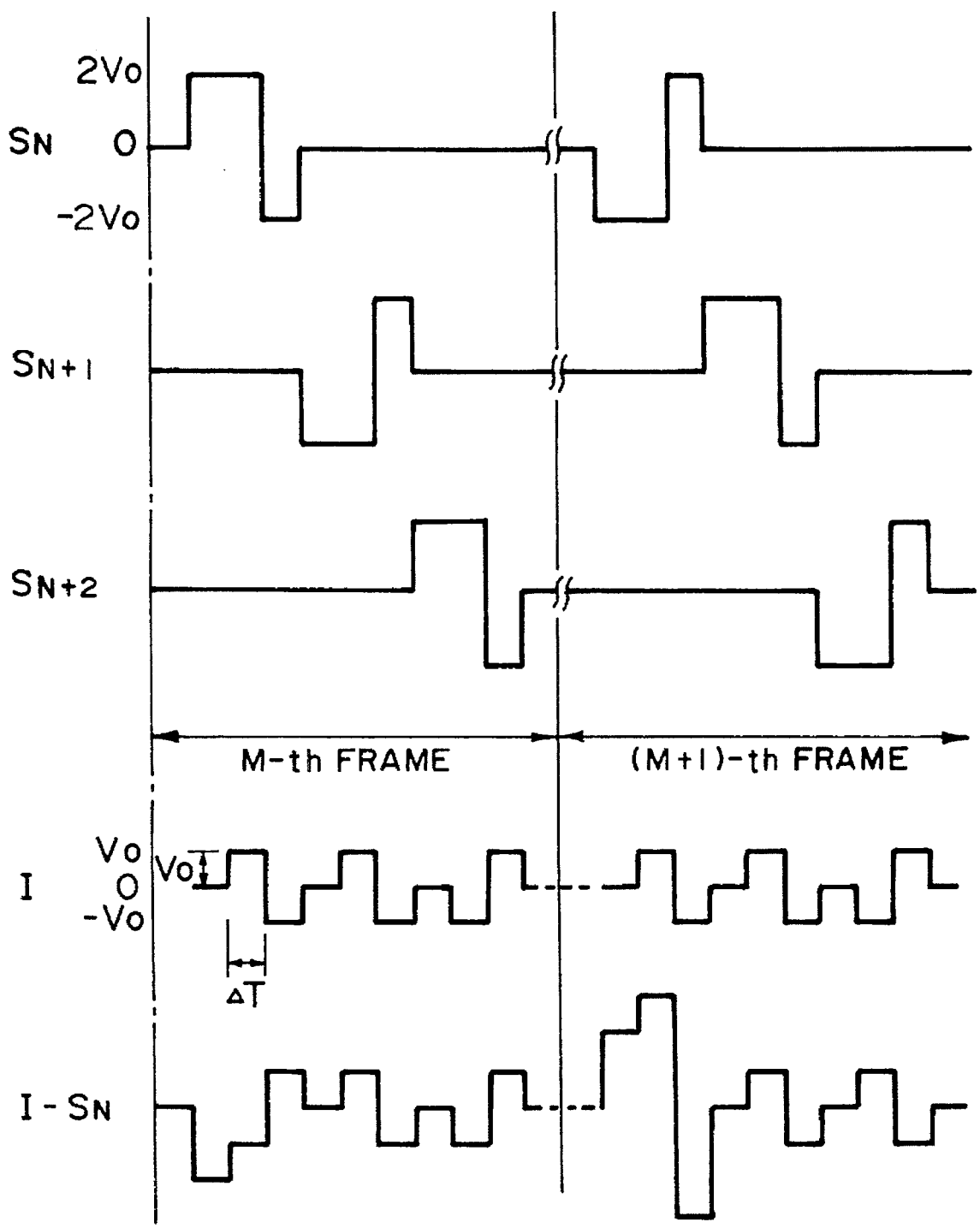
F I G. 12

LIQUID CRYSTAL DEVICE

This application is a continuation of application Ser. No. 08/013,327, filed Feb. 4, 1993, now abandoned.

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta nd/\lambda)\pi,$$

wherein $I_0$: incident light intensity, $I$: transmitted light intensity, $\theta$: tilt angle, $\Delta n$: refractive index anisotropy, $d$: thickness of the liquid crystal layer, $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle H (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. More specifically, it has been found that the tilt angle $\theta$ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle Ⓗ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142–143.

According to a rubbing treatment, a certain angle (pretilt angle) is induced between liquid crystal molecules in the vicinity of a substrate boundary and the substrate boundary. The pretilt angle is liable to fluctuate and result in a local deviation when the area treated by rubbing is enlarged. As a result, there arise a local alignment irregularity and a deviation in switching threshold value.

SUMMARY OF THE INVENTION

Accordingly, an object of the present invention is to provide a liquid crystal device having solved the above-mentioned problems, particularly a liquid crystal device which provides a large tilt angle of a chiral smectic liquid crystal in a non-helical structure and provides a display capable of stably displaying a high-contrast image in a large area and yet free from after-image.

According to the present invention, there is provided a liquid crystal device, comprising: a pair of substrates and a liquid crystal disposed between the substrates; at least one of said pair of substrates having thereon an alignment film comprising a polyimide formed by reaction between an acid component and at least two diamine components of formula (1) below:

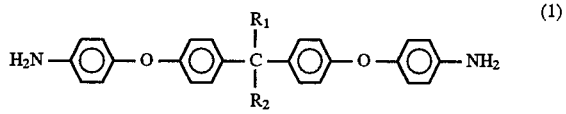

wherein $R_1$ and $R_2$ independently denote an alkyl group or fluoroalkyl group having 1–10 carbon atom.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view showing an alignment state of a chiral smectic liquid crystal aligned according to the present invention.

FIG. 5 is an illustration of C-director alignments in a uniform alignment state.

FIG. 6 is an illustration of C-director alignments in a splay alignment state.

FIGS. 7A and 7B are plan views illustrating tilt angles θ in a uniform alignment state and a splay alignment state, respectively.

FIG. 8 is a sectional view showing a charge distribution, a direction of a spontaneous polarization $P_S$ and a direction of a reverse electric field Vrev.

FIG. 9 is a schematic plan view illustrating changes in tilt angle θ during and after application of an electric field.

FIG. 12 is a waveform diagram illustrating driving waveforms used in an embodiment of the present invention.

DETAILED DESCRIPTION OF THE INVENTION

Figure 1:
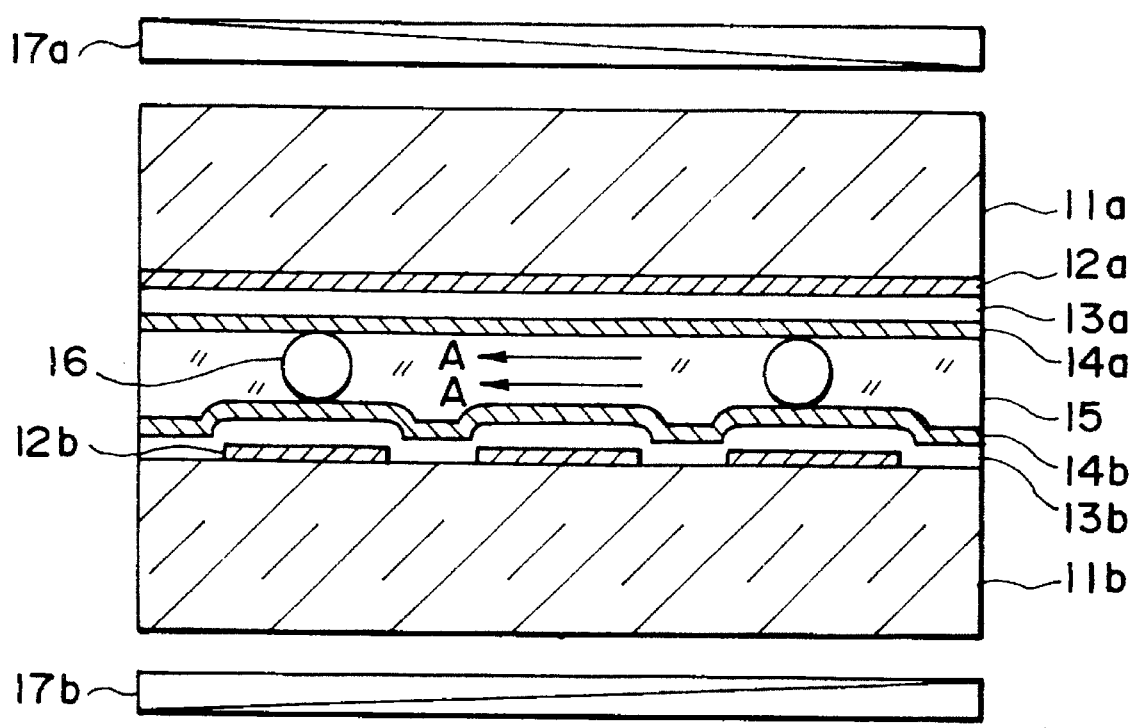
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200–1000 Å-thick insulating films 13a of $SiO_2$, $TiO_2$, $Ta_2O_5$, etc., and 50–1000 Å-thick alignment control films 14a and 14b.

In this instance, the alignment control films 14a and 14b have been treated by rubbing, as a uniaxial aligning treatment, in directions which are parallel to each other and in the same direction (indicated by arrows A in FIG. 1). A chiral smectic liquid crystal 15 is disposed between the substrates 11a and 11b, and the spacing between the substrates 11a and 11b is set to provide the liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The thus formed cell structure is sandwiched between a pair of polarizers 17a and 17b arranged in cross nicols.

In the present invention, it is also possible to dispose the rubbing directions provided to a pair of substrates to be parallel and opposite to each other or crossing each other at an intersection angle of 2–30 degrees.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive.

According to the present invention, at least one of the alignment films 14a and 14b is constituted by a polyimide formed through reaction between an acid component and at least two diamine components each represented by the above-mentioned formula (1).

The polyimide film used in the present invention may be formed by a subjecting to dehydrocyclization under heating a polyamide acid obtained by condensation between such a carboxylic dianhydride as ordinarily used in production of polyimide and a diamine as will be described hereinbelow.

The diamine component represented by the above-mentioned formula (1) may be those wherein $R_1$ and $R_2$ independently denote an alkyl group or fluoroalkyl group having 1–10 carbon atoms, preferably 1–6 carbon atoms. It is preferred that at least one of the at least two diamine components is a fluorine-containing diamine.

Specific examples of the diamine represented by the formula (1) may include: 2,2-bis(4-aminophenoxyphenyl) propane, 3,3-bis(4-aminophenoxyphenyl)pentane, 4,4-bis (4-aminophenoxyphenyl)heptane, 5,5-bis(4-aminophenoxyphenyl)nonane, 2,2-bis(4-aminophenoxyphenyl)butane, 2,2-bis(4-aminophenoxyphenyl)pentane, 2,2-bis(4-aminophenoxyphenyl)hexane, 3,3-bis(4-aminophenoxyphenyl)hexane, 3,3-bis(4-aminophenoxyphenyl)heptane, 4,4-bis(4-aminophenoxyphenyl)octane, 2,2-bis(4-aminophenoxyphenyl)-3-methylbutane, 2,2-bis(4-aminophenoxyphenyl)-4-methylpentane, 2,2-bis(4-aminophenoxyphenyl)-5-methylhexane, 3,3-bis(4-aminophenoxyphenyl)-2-methylpentane, 2,2-bis(4-aminophenoxyphenyl)hexafluoropropane, and 2,2-bis(4-aminophenoxy-phenyl)decylfluoropentane. These amines are used in combination of two or more species.

On the other hand, the acid component may be tetracarboxylic dianhydrides ordinarily used in production of polyimides. Preferred examples thereof may include: naphthalenetetracarboxylic acid derivatives, such as 1,4,5,8-naphthalenetetracarboxylic dianhydride, 1,2,5,6-naphthalenetetracarboxylic dianhydride, and 2,3,6,7-naphthalenetetracarboxylic dianhydride; and others, including pyromellitic dianhydride, benzophenonetetracarboxylic dianhydride, 3,3',4,4'-tetracarboxybiphenyl dianhydride, 2,3,3',4'-tetracarboxybiphenyl dianhydride, 2,3,6,7-tetracarboxyanthracene dianhydride, and 3,3",4,4"-tetracarboxyterphenyl dianhydride.

In synthesizing a polyamide acid through condensation of the diamine components and the acid component, it is preferred to use about 1 wt. part of the diamine components per 1 wt. part of the diamine component for the condensation, followed by dehydrocyclization under heating to form a polyimide film.

The polyimide constituting the alignment film in the present invention may preferably have a number-average molecular weight of $10^4$–$10^5$ more preferably $2 \times 10^4$–$8 \times 10^4$, when measured by GPC (gel permeation chromatography) in the form of a polyamide acid precursor as corresponding to the molecular weights of standard polystyrenes.

The alignment film in the present invention may assume a form of either a mixture of polyimides or a copolyimide.

The alignment film may be formed on a substrate by forming a solution of a polyamide acid as polyimide precursor in a solvent, such as dimethylformamide, dimethylacetamide, dimethylsulfoxide and N-methylpyrrolidone at a concentration of 0.01–40 wt. % and applying the solution onto the substrate by spinner coating, spray coating, roller coating, etc., followed by heating at 100°–350° C., preferably 200°–300° C., for dehydrocyclization to form a polyimide or polyamideimide film. The polyimide or polyamideimide film thus formed may be rubbed with a cloth, etc., in one direction. In case where a pair of substrates are both provided with alignment films, the alignment films on both substrates may be rubbed in directions which are parallel and identical or opposite to each other or cross each other at an angle of 2–30 degrees.

The alignment film of the polyimide may be formed in a thickness of 30 Å–1 μm, preferably 200 Å–2000 Å. In this case, the insulating films 13a and 13b shown in FIG. 1 can be omitted. In case where the alignment film 14a or 14b is formed on the insulating film 13a or 13b, the alignment film may be formed in a thickness of 200 Å or less, preferably 100 Å or less.

The liquid crystal material 15 used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range) is preferred. Preferred examples of such a liquid crystal material may include liquid crystal materials (1)–(5) below comprising the following liquid crystals [A], [B] and [C] in the indicated proportions by weight.

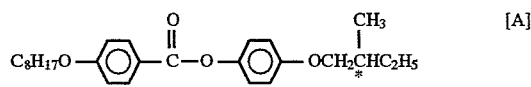

[A]

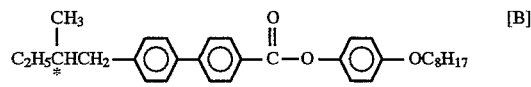

[B]

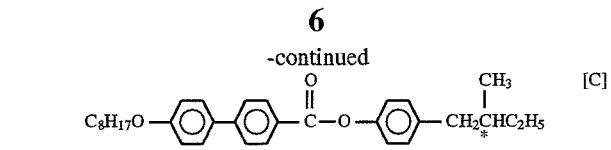

[C]

Liquid crystal material
(1) $[A]_{90}/[B]_{10}$
(2) $[A]_{80}/[B]_{20}$
(3) $[A]_{70}/[B]_{30}$
(4) $[A]_{60}/[B]_{40}$
(5) [C]

Figure 2:
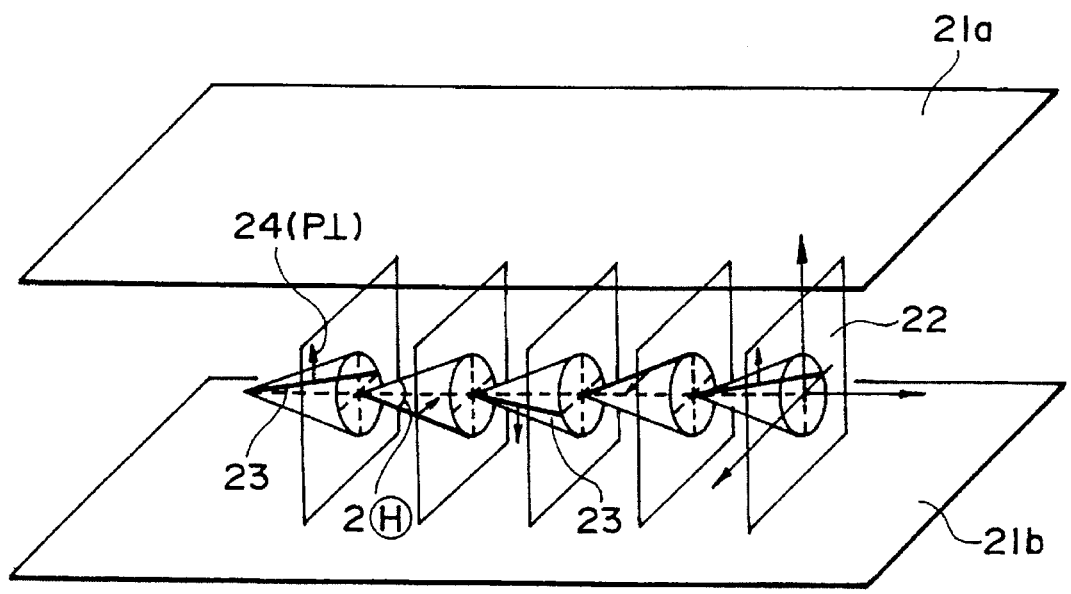
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle (H) in chiral smectic phase of such a helical structure.

When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
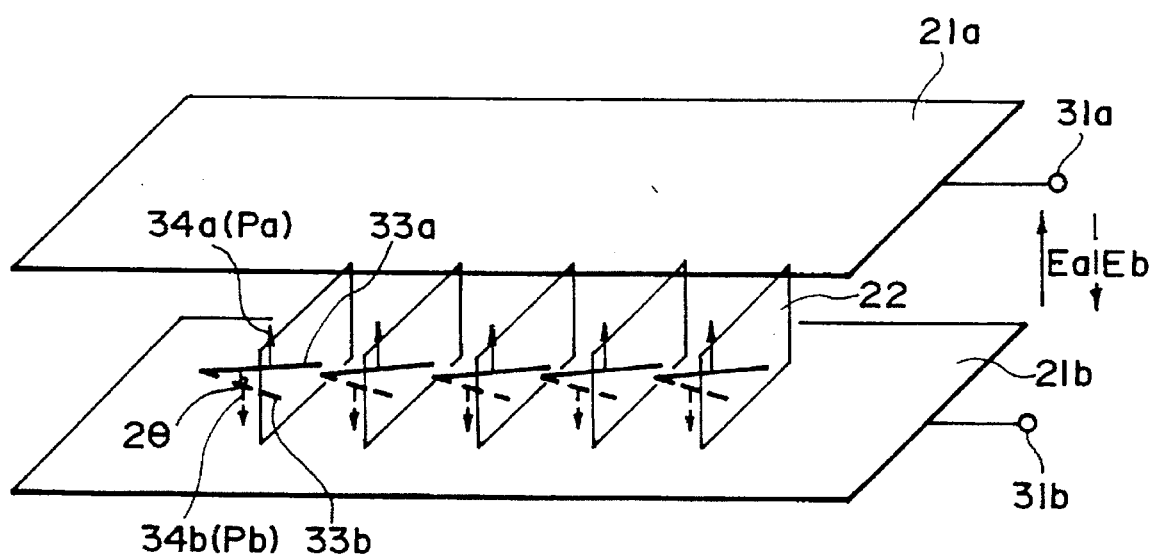
FIG. 3 is a perspective view showing schematically an alignment state of a chiral smectic liquid crystal having a non-helical structure.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained by the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5 more specifically shows a change in C-directors. Referring to FIG. 5, at $U_1$ are shown C-directors 81 (each being a projection of a molecular long axis onto an imaginary plane perpendicular to the normal to a molecular layer 50) in one stable orientation state, and at $U_2$ are shown C-directors 81 in the other stable orientation state.

On the other hand, an alignment state attained by a conventional rubbing-treated polyimide film may be represented by a C-director diagram of FIG. 6, which shows an alignment state wherein molecular axes are twisted in a large degree from the upper substrate 51a to the lower substrate 51b to provide a smaller tilt angle θ.

FIG. 7A is a schematic plan view illustrating a tilt angle θ in an alignment state where C-directors 81 assume a state shown in FIG. 5 (referred to as "uniform alignment state"), and FIG. 7B is a schematic plan view illustrating a tilt angle θ in an alignment state where C-directors 81 assume a state shown in FIG. 6 (referred to as "splay alignment state"). In these figures, reference numeral 70 denotes a rubbing axis provided to the above-mentioned fluorine-containing polyimide film, numeral 71a denotes an average molecular axis in the orientation state $U_1$, numeral 71b denotes an average molecular axis in the orientation state $U_2$, numeral 72a denotes an average molecular axis in the orientation state $S_1$, and numeral 72b denotes an average molecular axis in the orientation state $S_2$. The average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev = 2P_S/(Ci+C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
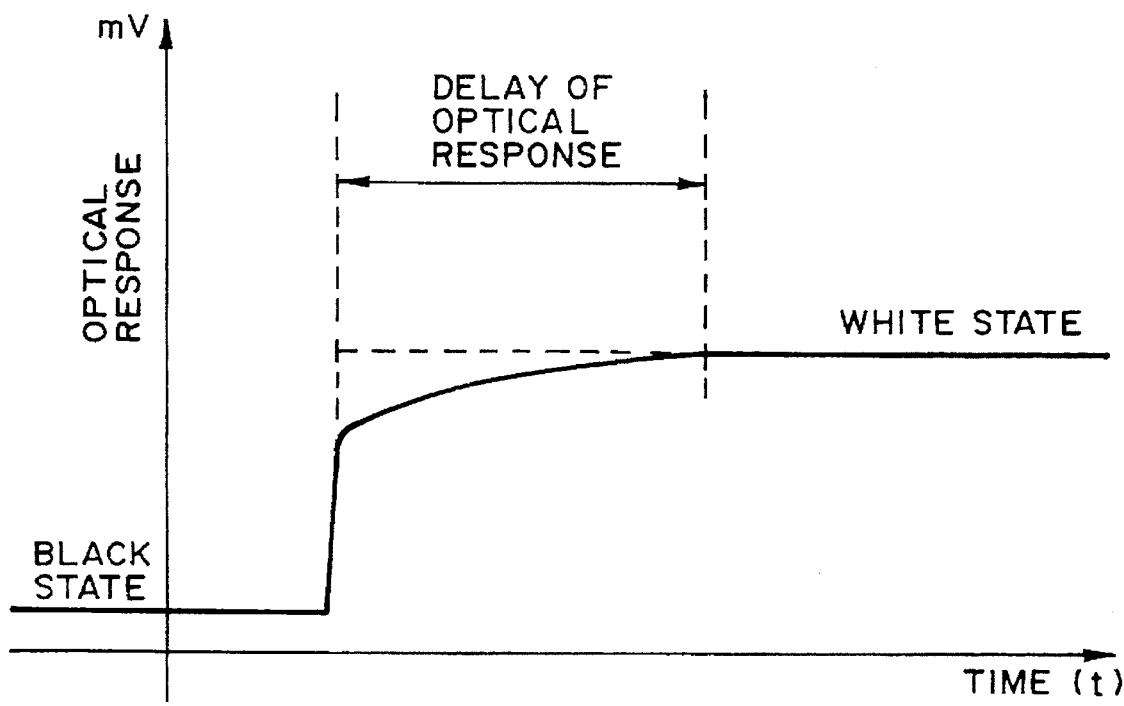
FIGS. 10 and 11 are graphs showing optical response characteristics according to a conventional device and the present invention, respectively.

FIG. 9 is a plan view showing a change in optical response in a splay alignment state given by a conventional polyimide alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle ⓗ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 10.

Figure 11:
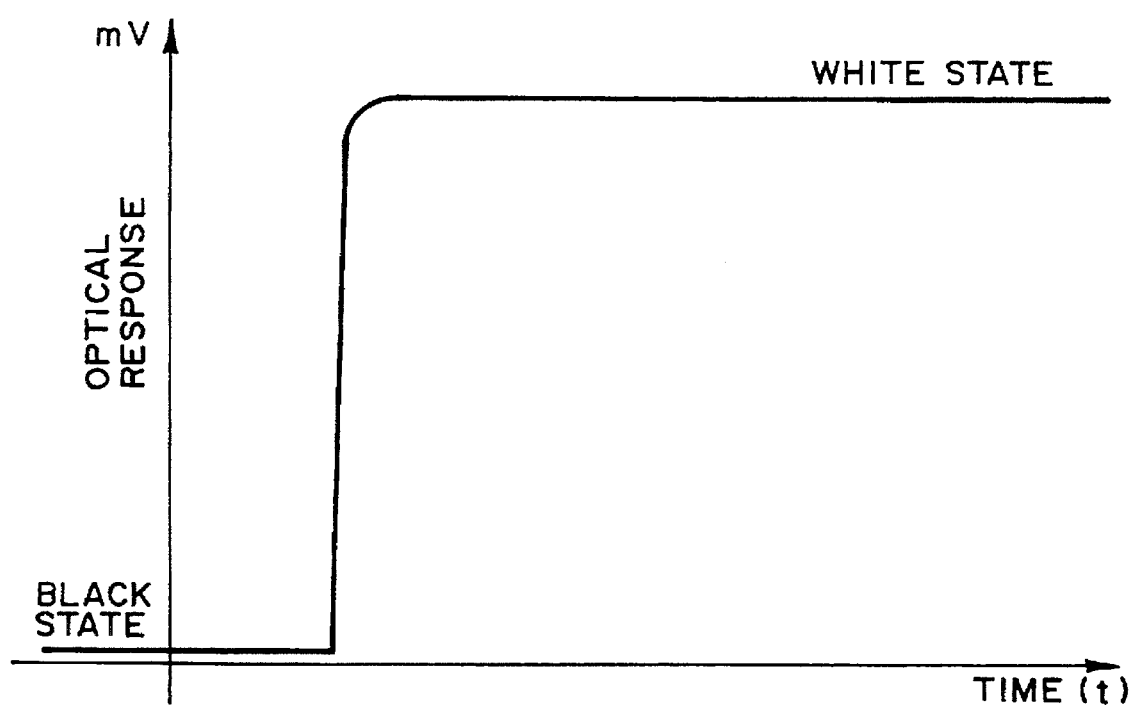

In the alignment state given by using the above-mentioned polyimide or polyamideimide film of the specific structure of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle ⓗ. An optical response at this time according to the present invention is shown in FIG. 11. FIG. 11 shows that a delay in optical response causing after-image is obviated and a high contrast in memory states is caused.

More specifically, when the alignment film of the present invention is used, it is possible to provide the above-mentioned uniform alignment state.

Hereinbelow, the present invention will be explained based on Examples.

EXAMPLE 1

Two 1.1 mm-thick glass plates each provided with a 1000 Å-thick ITO film were respectively coated with a 3.5 wt. % solution of a polyamide acid formed by reaction among 100 wt. parts of pyromellitic dianhydride, 50 wt. parts of 2,2-bis(4-aminophenoxyphenyl)hexafluoropropane and 50 wt. parts of 2,2-bis(4-aminophenoxyphenyl)-4-methylpentane in a mixture solvent of N-methylpyrrolidone/n-butylcellosolve=1/1 by means of a spinner rotating at 3000 rpm for 30 sec.

The coating film thus formed was then subjected to baking at 250° C. for 1 hour. The polyimide measured in the state of the polyamide acid by GPC showed a number-average molecular weight of about $6 \times 10^4$. The polyimide film thus formed in a thickness of 400 Å was then rubbed in one direction with a nylon fiber-planted cloth.

On one of the two glass plates thus treated, 1.5 μm-dia. alumina beads were dispersed, and the other glass plate was superposed thereon so that their rubbing axes were parallel to each other and disposed in the same direction to form a blank cell (panel) having a diagonal size of 15 inches.

The blank cell was filled with a ferroelectric smectic liquid crystal ("CS-1014" (trade name), available from Chisso K.K.) under vacuum and, after sealing, was gradually cooled from isotropic phase at a rate of 0.5° C./hour to 30° C., whereby an alignment was effected. The "CS-1014" liquid crystal in the cell showed the following phase transition series.

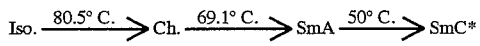

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=15 degrees, transmittance in the brightest state=58%, transmittance in the darkest state=1.2%, contrast ratio=48:1.

The delay in optical response causing after-image was 0.1 sec or less.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Further, substantially no fluctuation in switching threshold value was observed over the entire area, thus showing a good result. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and ΔT=20–70 μsec.

In order to evaluate the homogeneity of alignment in the liquid crystal device, the pretilt angle α (angle of inclination of liquid crystal molecules with respect to a substrate surface) was measured over the extension of the device. For the measurement, two substrates provided with rubbed alignment film in the above-described manner were superposed with each other so that their rubbing directions were parallel and opposite to each other to form a cell which was then filled with the above liquid crystal. The tilt angle α was measured in SmA phase according to the crystal rotation method of 9 parts of the cell, whereby a maximum value $α_{max}$ of 18.3 degrees and a minimum value $α_{min}$ of 17.7 degrees, thus showing a difference Δα ($=α_{max}-α_{min}$)=0.6 degree.

EXAMPLES 2–7

Liquid crystal cells were prepared and evaluated in the same manner as in Example 1 except for the use of alignment films formed from polyamide acids (all in a number-average molecular weight of about 5×10⁴) formed from the indicated amounts (wt. parts) species of carboxylic acid components and diamines and liquid crystal materials shown in Table 1 below.

The measured results of contrast ratio, delay in optical response, difference Δα ($=α_{max}-α_{min}$) and evaluation of homogeneity of alignment are inclusively shown in Table 2 appearing hereinafter. As a result of multiplexing drive in the same manner as in Example 1, similar results were obtained as in Example 1 with respect to the contrast and persistence.

TABLE 1

| Ex. | Acid and diamine components | | L.C. material |
|---|---|---|---|
| 2 | Pyromellitic dianhydride | 50 | "CS-1014" |
| | 2,2-Bis(4-aminophenoxyphenyl)-butane | 25 | |
| | 4,4-Bis(4-aminophenoxyphenyl)-heptane | 25 | |
| 3 | Pyromellitic dianhydride | 25 | "CS-1014" |
| | 3,3',4,4'-Tetracarboxybiphenyl dianhydride | 25 | |
| | 2,2-Bis(4-aminophenoxyphenyl)-hexafluoropropane | 20 | |
| | 2,2-Bis(4-aminophenoxyphenyl)-pentane | 30 | |
| 4 | 2,3,6,7-Naphthalenetetracarboxylic dianhydride | 50 | "CS-1014" |
| | 2,2-Bis(4-aminophenoxyphenyl)-hexafluoropropane | 25 | |
| | 2,2-Bis(4-aminophenoxyphenyl)-butane | 25 | |
| 5 | Pyromellitic dianhydride | 20 | "CS-1014" |
| | Benzophenonetetracarboxylic dianhydride | 30 | |
| | 2,2-Bis(4-aminophenoxyphenyl)-4-methylpentane | 25 | |
| | 2,2-Bis(4-aminophenoxyphenyl)-hexane | 25 | |
| 6 | Pyromellitic dianhydride | 50 | Above-described liquid crystal material (3) (=[A]₇₀/[B]₃₀ mixture) |
| | 2,2-Bis(4-aminophenoxyphenyl)-hexaluoropropane | 20 | |
| | 2,2-Bis(4-aminophenoxyphenyl)-4-methylpentane | 30 | |
| 7 | Pyromellitic dianhydride | 50 | Above-described liquid crystal material (3) |
| | 2,2-Bis(4-aminophenoxyphenyl)-butane | 25 | |
| | 4,4-Bis(4-aminophenoxyphenyl)-heptane | 25 | |

TABLE 2

| Ex. | Contrast ratio | Optical delay time (sec) | Δα (deg.) | Homogeneity of alignment* |
|---|---|---|---|---|
| 2 | 30:1 | 0.3 | 0.8 | ⊚ |
| 3 | 45:1 | 0.2 | 0.4 | ⊚ |
| 4 | 35:1 | 0.3 | 0.5 | ⊚ |
| 5 | 28:1 | 0.4 | 0.7 | ⊚ |
| 6 | 40:1 | 0.2 | 0.8 | ⊚ |
| 7 | 25:1 | 0.4 | 0.7 | ⊚ |

*Evaluation standards
⊚: Homogeneous alignment free from threshold deviation.
o: Slight local deviation in switching threshold value.

COMPARATIVE EXAMPLES 1–6

Liquid crystal cells were prepared and evaluated in the same manner as in Example 1 except for the use of alignment films formed from polyamide acids obtained from acid components and diamine components shown in Table 3 or commercially available products shown in Table 4 and liquid crystal materials shown in Tables 3 and 4. The measured results of contrast ratio, delay in optical response, difference in pretilt angle Δα and homogeneity of alignment are inclusively shown in Table 5.

As a result, Comparative Examples 3–6 provided liquid crystal devices showing a lower contrast and causing after image. Comparative Examples 1–2 provided liquid crystal devices showing a somewhat larger fluctuation in pretilt angle and some irregularity in alignment for large area devices.

TABLE 3

| Comp. Ex. | Acid and diamine components | | L.C. material |
|---|---|---|---|
| 1 | Pyromellitic dianhydride | 50 | "CS-1014" |
|   | 2,2-Bis(4-aminophenoxyphenyl)-4-methylpentane | 50 | |
| 2 | Benzophenonetetracarboxylic dianhydride | 50 | "CS-1014" |
|   | 2,2-Bis(4-aminophenoxyphenyl)-hexafluoropropane | 50 | |

TABLE 4

| Comp. Ex. | Alignment film material polyamide acid varnish) | L.C. material |
|---|---|---|
| 3 | "SP-700" (trade name) (mfd. by Toray K.K.; Aromatic polyimide-forming varnish) | "CS-1014" |
| 4 | "SP-700" (trade name) (mfd. by Toray K.K.; Aromatic polyimide-forming varnish) | Above-mentioned liquid crystal material (3) |
| 5 | "LQ-5200" (trade name) (mfd. by Hitachi Kasei K.K.; Polyimide-forming varnish) | "CS-1014" |
| 6 | "LQ-5200" (trade name) (mfd. by Hitachi Kasei K.K.; Polyimide-forming varnish) | Above-mentioned liquid crystal material (3) |

TABLE 5

| Comp. Ex. | Contrast ratio | Optical delay time (sec) | Δα (deg.) | Homogeneity of alignment |
|---|---|---|---|---|
| 1 | 27:1 | 0.4 | 2.5 | o |
| 2 | 29:1 | 0.2 | 3.0 | o |
| 3 | 8:1 | 1.5 | 5 | o |
| 4 | 7:1 | 2.5 | 5 | o |
| 5 | 10:1 | 1.2 | 4 | o |
| 6 | 8:1 | 2.2 | 6 | o |

As described above, according to the liquid crystal device of the present invention, it is possible to provide a high-quality display which is characterized by a very high contrast between the bright and dark states during multiplexing drive, free from switching threshold fluctuation over a wide area and is also free from unpleasant after-image.

What is claimed is:

1. A liquid crystal device, comprising: a pair of opposing substrates and a liquid crystal disposed between the substrates, at least one of said pair of opposing substrates having thereon an alignment film comprising a polyimide formed by reaction between a single acid component and at least two different diamine components of formula (1) below:

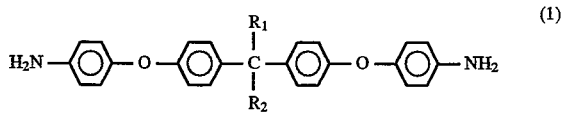

wherein $R_1$ and $R_2$ independently denote methyl, ethyl, propyl, butyl or pentyl.

2. A device according to claim 1, wherein at least one of the diamine components is a fluorine-containing diamine.

3. A device according to claim 1, wherein the alignment film is provided on both of said pair of substrates and has been rubbed.

4. A device according to claim 1, wherein the alignment film is provided on both of said pair of substrates and the alignment films provided on both substrates have been rubbed in directions which are parallel and identical to each other.

5. A device according to claim 1, wherein the alignment film is provided on both of said pair of substrates and the alignment films provided on both substrates have been rubbed in directions which are parallel and opposite to each other.

6. A device according to claim 1, wherein the alignment film is provided on both of said pair of substrates and the alignment films provided on both substrates have been rubbed in directions which cross each other at an angle of 2–30 degrees therebetween.

7. A device according to claim 1, wherein said liquid crystal is a chiral smectic liquid crystal.

* * * * *